United States Patent [19]

Miller

[11] Patent Number: 4,942,989

[45] Date of Patent: Jul. 24, 1990

[54] DEVICE FOR CARRYING LUMBER AND THE LIKE

[75] Inventor: Kevin W. Miller, Southfield, Mich.

[73] Assignee: Jupiter Products, Inc., Centerline, Mich.

[21] Appl. No.: 372,421

[22] Filed: Jun. 26, 1989

[51] Int. Cl.⁵ ............................................. B60R 9/00
[52] U.S. Cl. ...................... 224/42.45 R; 224/42.46 R; 224/322; 224/325; 224/42.43
[58] Field of Search ............... 224/42.45 R, 42.46 R, 224/309, 310, 321–325, 42.38, 42.42 R, 42.43, 273, 329; 248/215, 214; 211/70.5, 70.8, 119

[56] References Cited

U.S. PATENT DOCUMENTS

| 252,381 | 1/1882 | Hybre | 224/42.45 R |
|---|---|---|---|
| 1,780,044 | 10/1930 | Scholl | 224/42.43 |
| 1,919,271 | 7/1933 | Cady | 224/42.45 R |
| 2,302,300 | 11/1942 | Davies | 224/42.45 R |
| 2,425,629 | 8/1947 | Mayer | 224/42.45 R |
| 4,007,864 | 2/1977 | Hreha | 224/42.43 |
| 4,262,831 | 4/1981 | Buchanan | 224/42.45 R |
| 4,375,268 | 3/1983 | Speck | 224/42.45 R |
| 4,582,015 | 4/1986 | Hunter | 224/42.45 R |
| 4,596,348 | 6/1986 | Stamp | 224/42.46 R |
| 4,607,773 | 8/1986 | Mason | 224/42.45 R |

FOREIGN PATENT DOCUMENTS

| 1240545 | 12/1960 | France | 224/42.43 |
|---|---|---|---|
| 2043004A | 10/1980 | United Kingdom . | |
| 2196592 | 5/1988 | United Kingdom | 224/273 |

*Primary Examiner*—Henry J. Recla
*Assistant Examiner*—Keith Kupterschmid
*Attorney, Agent, or Firm*—Harness, Dickey & Pierce

[57] ABSTRACT

A device for carrying elongated articles too long to fit inside a vehicle. The device is unitarily formed from tubing and shaped into two parallel S-shaped members bridged by an intermediate member which provides lateral stability. Padding extends substantially the length of one of the loops of each S-shaped member. The device is primarily designed for the padded loops to be hooked over the sides of a vehicle while the oppositely facing loops are used to support the elongated articles in cooperation with another similar device located farther down the same side of the vehicle.

15 Claims, 2 Drawing Sheets

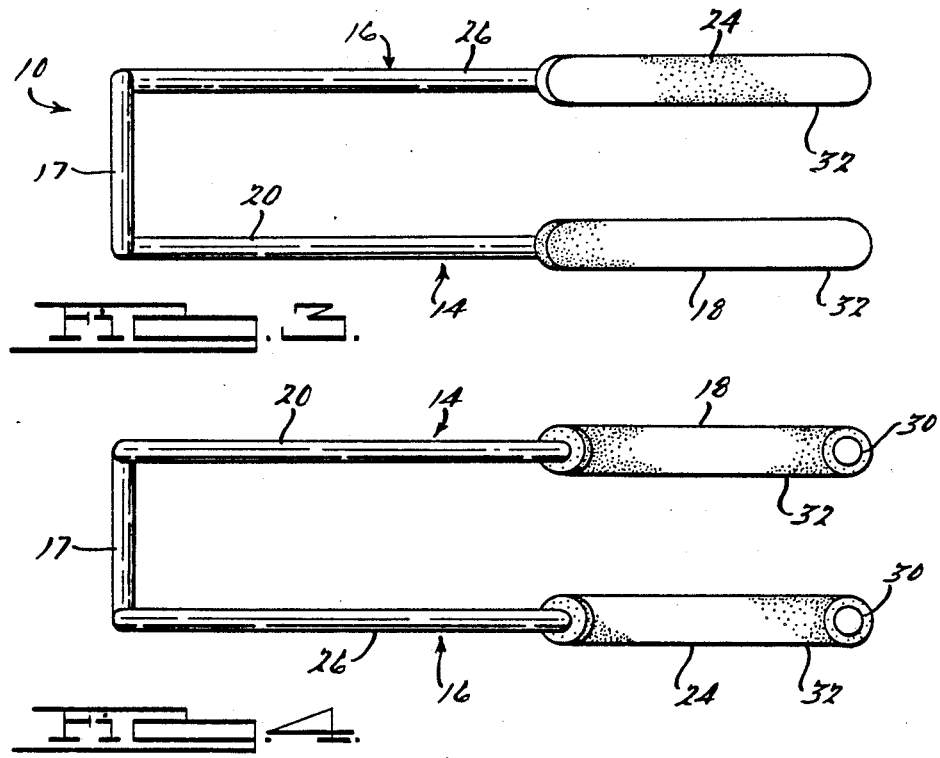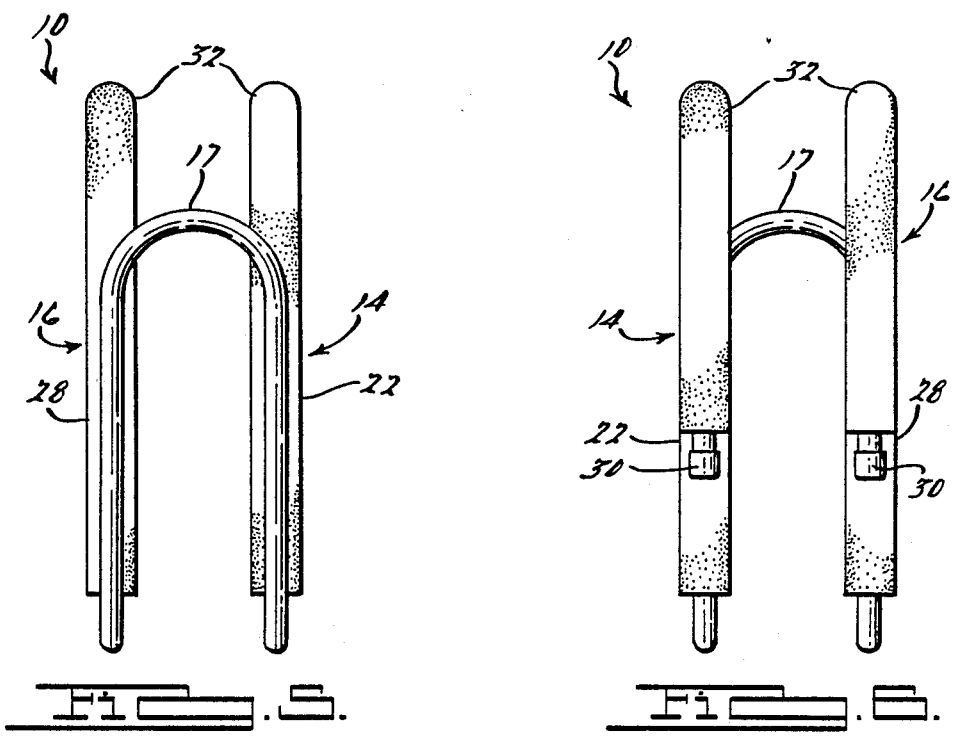

DEVICE FOR CARRYING LUMBER AND THE LIKE

BACKGROUND OF THE INVENTION

1. Technical Field

This invention relates to carrying devices mountable on a vehicle and, more particularly, to a support device which is removably attachable to a vehicle that can be used in tandem with a substantially similar device to carry elongated articles.

2. Discussion

Often it is desired to transport elongated articles too long to be placed inside the interior or trunk of a car, or even in the bed of a pickup truck. Further, long items extending from a car trunk or pickup bed can be dangerous and subject to damage.

Several support devices that are removably attachable to a vehicle and can be used in conjunction with another support device to carry elongated articles are known. U.S. Pat. No. 252,381 to Hyre relates to detachable hooked supports for attachment to farm wagons. U.S. Pat. No. 4,582,015 to Hunter relates to a ski rack attachable to a boat with clamps. U.S. Pat. No. 4,596,348 to Stump discloses a support device engagable with a fixed vehicle panel and a truck or hood panel. U.S. Pat. Nos. 1,919,271 and 2,302,300 to Cady and Davies, respectively relate to support devices which engage the vehicle in the space between the window and a rubber water guard adjacent the window.

Other support devices are known which mount to a vehicle in the area adjacent to the vehicle's window sill. U.S. Pat. No. 2,452,629 involves a luggage carrier using a hooked element and a cross element affixed to the bottom thereof. U.S. Pat. No. 4,607,773 discloses a support device which comprises a single S-shaped bracket connected to an adjustable cross bar.

None of the above-discussed devices is without its problems. Some of the devices do not provide means for secure attachment to the vehicle and could create a safety hazard. Additionally, some of the devices do not provide adequate safeguards for protecting a vehicle's finish. Further, some of the more complex devices having multiple parts to provide lateral stability require a relatively labor-intensive manufacturing process.

SUMMARY OF THE INVENTION

In accordance with the teachings of the present invention there is provided a device for convenient and safe support of elongated articles. The device includes a first S-shaped member and a second S-shaped member bridged by an intermediate member. The intermediate member is of sufficient length and rigidity to maintain the first and second S-shaped members substantially parallel and spaced apart from each other by a sufficient distance to provide lateral stability for the device. The first S-shaped member includes first and second oppositely facing U-shaped loops sharing a common arm while the second S-shaped member includes third and fourth oppositely facing U-shaped loops sharing a common arm. The first and third loops can be hooked over part of a vehicle while the second and fourth loops serve to support the elongated articles in cooperation with another substantially similar device.

BRIEF DESCRIPTION OF THE DRAWINGS

The various advantages of the present invention will become apparent to those skilled in the art after reading the following specification and by reference to the drawings in which:

FIG. 3 is a top view thereof;

FIG. 4 is a bottom view thereof;

FIG. 5 is a front view thereof; and

FIG. 6 is a rear view thereof.

DESCRIPTION OF THE PREFERRED EMBODIMENT

Figure 1:
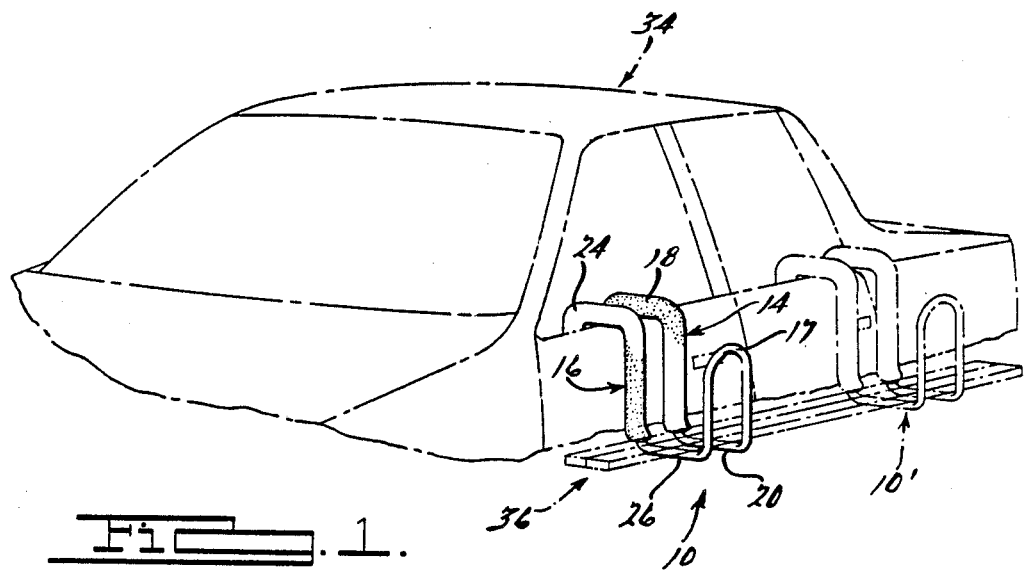
FIG. 1 is a perspective view of a device made in accordance with the preferred embodiment of this invention shown hooked over part of a vehicle being used in tandem with a second substantially identical device to carry pieces of lumber.
Figure 2:
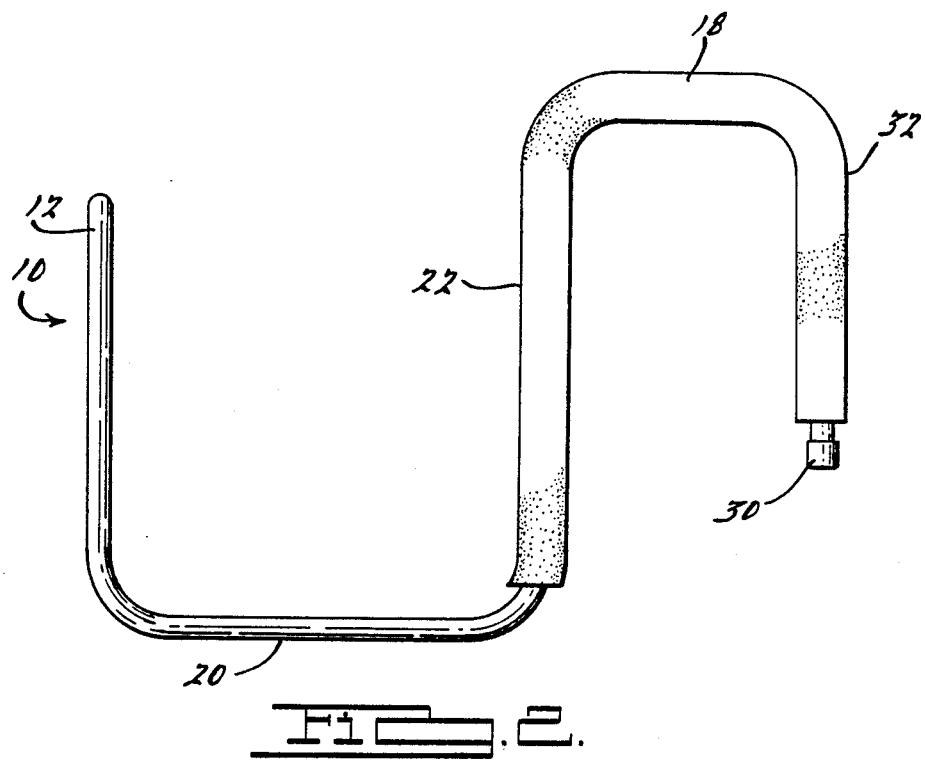
FIG. 2 is a left-side view of the device.

As generally shown in the drawings, the device 10 for carrying elongated articles is formed from a continuous length of hollow aluminum metal tubing 12. The device 10 is preferably unitarily formed from a continuous length of the tubing 12 into a first S-shaped member 14 and a second S-shaped member 16 which are bridged by an intermediate member 17, thereby, minimizing labor and production costs. The first S-shaped member 14 includes a first U-shaped loop 18 facing in a first or downward direction and a second U-shaped loop 20 facing in a second or upward direction which is opposite the direction of the first U-shaped loop 18. The first and second loops 18 and 20 share a common arm 22. The second S-shaped member 16 consists of a third U-shaped loop 24 facing in the downward direction and a fourth U-shaped loop 26 facing in the upward direction. The third and fourth loops 24 and 26 share a common arm 28. The intermediate member 17 bridges the ends of the second and fourth loops 20 and 26, and is of sufficient length and rigidity to maintain the first and second S-shaped members 14 and 16 substantially parallel and spaced apart from each other a sufficient distance to provide lateral stability for the device 10.

In this embodiment the first and third downward facing U-shaped loops 18 and 24 have outer side arms about 7.0 inches in length. Upper portions of the downward facing U-shapes are about 3.25 inches wide. Common arms 22 and 28, shared with the second and fourth loops respectively, are about 9.25 inches in length. Additionally, the second and fourth upward facing U-shaped loops 20 and 26 have outer side arms about 6.25 inches in length and bottom portions of the upward facing U-shapes are about 7.25 inches wide. The intermediate member 17 is an arc with approximately a 1.5 inch radius that serves to separate the first and second S-shaped members 14 and 16 a distance of approximately 3 inches. The remaining eight arcs in the device 10 are also approximately of 1.5 inch radius.

Protective end caps 30 are disposed on the ends of the tubing 12 for the purpose of protecting the vehicle's finish during installation and detachment of the device 10. Padding 32 may be provided on each S-shaped member 14 and 16 extending substantially along the length of the first and third loops 18 and 24. The padding 32 serves to further protect the finish of the vehicle and can take the form of hollow, foam sleeve of the type used to prevent sweating of pipes.

In use the padded first and third loops 18 and 20 are hooked over part of a vehicle 34, such as an open trunk or pair of windows as shown in FIG. 1. The second and fourth loops 20 and 26 serve to support elongated articles 36, such as lumber, in cooperation with a substantially similar device 10', disposed further along the length of the vehicle 34.

The present invention provides means for secure and safe attachment to a vehicle. Additionally, the present invention provides adequate safeguards for protecting a vehicle's finish during installation and use. Further, provided is a simple device capable of providing lateral stability which is manufactured with minimal labor.

Although the invention has been described in detail with reference to a certain preferred embodiment and a specific example, variations and modifications exist within the scope and spirit of the invention as described and as defined in the claims. For example, it is envisioned that the device could be made from two separate S-shaped members joined by an intermediate member along the length of the S-shaped members instead of forming the device from a continuous length of tubing. This alternative construction, while not preferred because of increased manufacturing expense and other factors, should fall within the spirit of this invention.

While the above description constitutes the preferred embodiment of the invention, it will be appreciated that the invention is susceptible to modification, variation, and change without departing from the proper scope or fair meaning of the accompanying claims.

What is claimed is:

1. A lightweight device adapted for manual mounting and detachment, for carrying elongated articles along an outside surface of an automotive vehicle or the like, said device comprising:
   a first S-shaped member having first and second oppositely facing U-shaped loops sharing a common arm;
   a second S-shaped member having third and fourth oppositely facing U-shaped loops sharing a common arm;
   an intermediate member connecting the first and second S-shaped members together, said intermediate member being of sufficient length and rigidity to maintain said first and second S-shaped members in substantially adjacent and parallel relationship to each other while being spaced apart from each other by a sufficient distance to provide lateral stability when the device is mounted on the vehicle, said first, second and intermediate members being shaped from a one-piece continuous length of tubing; and
   whereby the first and third loops are adapted to be hooked over a first part of the vehicle, with the second and fourth loops serving to support one end of the elongated articles along the outside surface of the vehicle in cooperation with another substantially similar device, adapted to be hooked over a second part of the vehicle, which supports a second end of the articles.

2. The device of claim 1 which further comprises: padding on the first and third loops for protecting the vehicle's finish.

3. The device of claim 1 which further comprises: end caps on ends of the tubing.

4. The device of claim 1 wherein said intermediate member is a semi-circular arc bridging adjacent end portions of the second and fourth loops.

5. The device of claim 1 wherein said tubing is hollow aluminum tubing.

6. Apparatus, adapted for manual attachment and removal, for carrying elongated articles along an outside surface of a vehicle, said apparatus comprising:
   a pair of devices used in tandem;
   each device having a first S-shaped member having first and second oppositely facing U-shaped loops sharing a common arm, a second S-shaped member having third and fourth oppositely facing U-shaped loops sharing a common arm, and an intermediate member bridging ends of the second and fourth loops, said intermediate member being of sufficient length and rigidity to maintain said first and second S-shaped members in substantially adjacent and parallel relationship while spaced apart from each other by a sufficient distance to provide lateral stability when the device is mounted on the vehicle, said first, second and intermediate members being formed of a single continuous piece of tubing, and whereby the first and third loops of each device can be hooked over two distinct parts of the vehicle, with the second and fourth loops of each device serving to support the elongated articles alongside the vehicle.

7. The apparatus of claim 6 which further comprises: padding on the first and third loops for protecting the vehicle.

8. The apparatus of claim 6 which further comprises: end caps on ends of the tubing.

9. The apparatus of claim 6 wherein said intermediate member is an arc having a radius of about 1.5 inches and bridges adjacent end portions of the second and fourth loops.

10. The apparatus of claim 6 wherein said tubing is hollow aluminum tubing.

11. A method for carrying one or more elongated articles along an outside surface of an automotive vehicle, said method comprising:
   providing a first, manually attachable and removable, device with a first S-shaped member having first and second oppositely facing U-shaped loops sharing a common arm, a second S-shaped member having third and fourth oppositely facing U-shaped loops sharing a common arm, and an intermediate member bridging ends of the second and fourth loops, said intermediate member connecting the first and second S-shaped members together to maintain them in substantially adjacent relationship to each other while being sufficiently spaced apart to provide lateral stability when mounted on the vehicle, said first, second and intermediate members forming a continuous length of tubing;
   providing a second, manually attachable and removable, device with a first S-shaped member having first and second oppositely facing U-shaped loops sharing a common arm, a second S-shaped member having third and fourth oppositely facing U-shaped loops sharing a common arm, and an intermediate member bridging ends of the second and fourth loops, said intermediate member connecting the first and second S-shaped members together to maintain them in substantially adjacent relationship to each other while being sufficiently spaced apart to provide lateral stability when mounted on the vehicle, said first, second and intermediate members forming a continuous length of tubing;
   hooking said first and third loops of said first device over a first part of the vehicle;
   hooking said first and third loops of said second device over a second part of the vehicle; and
   placing the one or more elongated articles in said second and fourth loops of each device.

12. The method of claim 11 wherein said first and second parts of the vehicle are adjacent window openings.

13. The method of claim 11 which further comprises:
placing padding on the first and third loops of the first device; and
placing padding on the first and third loops of the second device.

14. The method of claim 11 which further comprises: end caps on the ends of the tubing.

15. A device for carrying elongated articles on a vehicle or the like, said device comprising:
a first S-shaped member having first and second oppositely facing U-shaped loops sharing a common arm;
a second S-shaped member having third and fourth oppositely facing U-shaped loops sharing a common arm;
an intermediate member connecting the first and second S-shaped members together, said intermediate member being an arc having a radius of about 1.5 inches and being sufficiently rigid to maintain said first and second S-shaped members substantially parallel, said intermediate member bridging adjacent end portions of said second and fourth loops to provide lateral stability for the device;
an end cap disposed on each end of the tubing;
protective padding disposed on the first and third loops for protecting the vehicle; and
whereby the first and third loops can be hooked over a part of the vehicle, with the second and fourth loops serving to support the elongated articles in cooperation with another substantially similar device.

* * * * *